Patented May 29, 1951

2,554,899

UNITED STATES PATENT OFFICE 2,554,899

GREASE-PROOF PAPER AND PROCESS OF MAKING THE SAME

William W. Cowgill, Fairfield, Conn., assignor to United States Rubber Company, New York, N. Y., a corporation of New Jersey No Drawing. Application December 20, 1949, Serial No. 134,147

4 Claims. (Cl. 117—76)

This invention relates to paper provided with coatings rendering it grease-proof and waterproof. More particularly, it relates to such paper which is so economical to produce that its production is commercially feasible. The invention also relates to a process of making such paper.

I have conducted extensive work on the coating of paper with aqueous dispersions of polymeric material, especially a styrene-acrylonitrile resinous copolymer and particularly with mixed dispersions of a styrene-acrylonitrile resinous copolymer and a butadiene-acrylonitrile rubbery copolymer. Much of this work, insofar as it relates to paper-glossing, is described in my co-pending applications Serial No. 769,046 filed August 16, 1947, Serial No. 54,211 filed October 12, 1948, Serial No. 62,117 filed November 26, 1948, now abandoned Serial No. 75,369 filed February 9, 1949 and Serial No. 133,183 filed December 15, 1949.

A problem which has been encountered in the coating of paper with such dispersions has been that unless a very thick film of the material, of the order of 4 to 10 pounds, and generally 6 to 10 pounds of polymeric material per 1000 square feet of surface, is applied to the paper, the surface irregularities caused by holes or cavities in the surface of the paper and projecting fibers prevent attainment of a grease-proof film. Furthermore excessive absorption of the dispersion into the paper often occurred. The result was that an excessive amount of the expensive dispersion was required in order to achieve a coating which would give the desired protection and attractiveness.

I have now found that the aforementioned difficulties can be overcome in a highly advantageous manner and a new and very advantageous article of manufacture made available to the art by first applying to the paper a coating of an aqueous dispersion of a resinous copolymer of butadiene and styrene and a rubbery copolymer of butadiene and styrene, removing water therefrom, and then applying a second coating of an aqueous dispersion of a resinous copolymer of styrene and acrylonitrile and a rubbery copolymer of butadiene and acrylonitrile which is then dried to remove water.

It was very surprising to discover that these results could be achieved by applying to the paper a first coat of an aqueous dispersion of a butadiene-styrene resin and a butadiene-styrene synthetic rubber, because many other generally similar materials such as dispersions of polyvinyl chloride, dispersions of styrene-acryonitrile resin and butadiene-acrylonitrile rubber and dispersions of butadiene-acrylonitrile rubber and other materials such as aqueous methyl cellulose solutions and aqueous carboxymethyl cellulose solutions, have been tried as first coatings by me but were not successful even though the coating was calendered after drying in an effort to reduce the surface fibers and increase the smoothness of the surface. The results achieved by the present invention were even more surprising because the materials of the first and second coatings are not miscible with one another. That is to say, resinous copolymers of styrene and acrylonitrile and rubbery copolymers of butadiene and acrylonitrile are not compatible (in a strict chemical sense, i. e., they cannot be caused to form a homogeneous mixture) with resinous copolymers of butadiene and styrene and rubbery copolymers of butadiene and styrene. Nevertheless, the second coating of the present invention adheres perfectly to the first coating and the two distinctly different coatings mutually cooperate with one another to give new and unexpected results.

Example

As an example of the present invention, paperboard of regular commercial type, fairly porous and with protruding fibers over its entire surface was coated with a mixture of an aqueous dispersion of a resinous copolymer of 17½% butadiene and 82½% styrene and an aqueous dispersion of a rubbery copolymer of butadiene and styrene containing approximately 54% bound butadiene and 46% bound styrene. These dispersions were separately prepared in the well-known manner, by emulsion polymerization using an emulsifier comprising an alkali metal salt of dehydrogenated or disproportionated rosin (compare Azorlosa, Ind. Eng. Chem., 41, 1626). The prepared latices were subsequently admixed in such proportions that the copolymer (solids) content of the mixture comprised 60% of the resinous butadiene-styrene copolymer and 40% of the rubbery butadiene-styrene copolymer. The resulting dispersion contained about 50% of the two copolymers.

The dispersion was applied to the paperboard at a rate such that the amount of copolymers applied was equal to about 0.3 pound per 1,000 square feet of surface. The coated board was then dried to remove the water.

There was then applied over the dried first coating a second coating of a composition composed of a mixture of an aqueous dispersion of a resinous copolymer of approximately 70% styrene and 30% acrylonitrile and an aqueous dispersion of a rubbery copolymer of approximately 65% butadiene and 35% acrylonitrile. Again these dispersions were separately prepared by emulsion polymerization. The emulsifier used in making the resin was composed of 3.5 parts of Duponol ME (sodium lauryl sulfate) and 0.5 part of Daxad 11 (sodium salt of condensed alkyl aryl sulfonic acid) per 100 parts of monomers and that used in making the rubbery copolymer was 3.0 parts of Duponol ME per 100 parts of monomers. The emulsifier is not critical and equivalent results can be obtained with any other equivalent emulsifier such as potassium laurate, etc. The prepared latices were blended in such proportions as to give a mixture containing approximately 60% of the resinous styrene-acrylonitrile copolymer and 40% of the rubbery butadiene-acrylonitrile copolymer and containing about 40% of solids (i. e., copolymers). The amount applied was equal to about 1.6 pounds of the two copolymers per 1,000 square feet of surface.

Upon removal of water from the second coating by drying, there was obtained a paper product which was very grease-proof and water-proof.

The present invention is remarkable because it gives the most grease-resistant coating with the smallest amount of solids application ever achieved, so far as I am aware.

The advantages of the present invention are attained when as little as 0.25 pound of the first coating and as little as 1.5 pounds of the second coating are aplied. These figures refer to amount of solids (copolymers) per 1,000 square feet of paper surface. The amounts applied may be considerably greater than these amounts, although obviously it is desirable to use as low an application as possible. Typical upper limits for practical commercial operation may be 0.5 pound for the first coat and 3.0 pounds for the second coat. Generally speaking, the amount of the second coat can be reduced as the amount of the first coat is increased.

The proportions of monomers entering into the resinous copolymer used in the first coat typically and preferably range from 80 to 90% of styrene and correspondingly from 20 to 10% of butadiene.

The proportions of butadiene and styrene entering into the rubbery copolymer used in the first coat can vary within any limits which give a rubbery, as distinguished from a plastic or resinous product. Such proportions typically range from 50 to 80% butadiene and correspondingly from 50 to 20% styrene. Any of the rubbery materials known as "GR-S" may be used in the practice of my invention.

The relative proportions of the butadiene-styrene resinous copolymer and the butadiene-styrene rubbery copolymer in the first coat typically and preferably range from 30 to 80% of the resinous copolymer and correspondingly from 70 to 20% of the rubbery copolymer.

The proportions of monomers combined in the resinous copolymer used in the second coat typically and preferably range from 65 to 80% styrene and correspondingly from 35 to 20% acrylonitrile.

The proportions of butadiene and acrylonitrile combined in the rubbery copolymer used in the second coat can vary within any limits which yield a rubbery product. Typically such rubbery copolymers contain from 55 to 80% combined butadiene and correspondingly from 45 to 20% combined acrylonitrile.

The relative proportions of the resinous styrene-acrylonitrile copolymer and the rubbery butadiene-acrylonitrile copolymer in the second coat can vary from 45 to 70% of the resinous copolymer and correspondingly from 55 to 30% of the rubbery copolymer.

It will be understood that although the materials of the first coating are not compatible with those of the second coating, i. e., cannot be fused therewith to give a uniform homogeneous mixture upon cooling, nevertheless the rubbery and resinous copolymers in each coating are compatible with one another.

The present invention produces the new result that a more grease-proof coating is produced by the invention than could be obtained by an equivalent application of either of the coating materials by itself.

In fact a coating of the material of the first coat alone is completely pervious to grease. Thus paper was coated with the material used in the first coating in the example above, using what is known as a "30 Rod" applicator. (A "Rod" is a wire-wrapped rod used for metering coatings in the laboratory and is well-known in the coating industry. It is used to spread a pool of the latex across the sheet of paper. The larger the number of the "Rod" the greater the size of the wire and the greater the extent of solids application). The paper was then dried. Hydrogenated cottonseed oil ("Crisco") was then applied on the cooled coated surface. It rapidly penetrated through the coating and then through the paper.

In a comparative test, paper was coated in the manner of the example, using a "7 Rod" for the first coating and a "20 Rod" for the second coating. The same type of grease ("Crisco") was applied to the coated surface, but no penetration whatever occurred even after a long period of time.

The present invention has the additional advantage that the coatings are non-toxic, tasteless, and odorless and are colorless unless dyes or coloring materials are included. Furthermore the product will not block, i. e., adjacent sheets will not consolidate into a block upon standing at room or moderately elevated temperature.

It should be mentioned that the first coating is not non-blocking and that the paper or board coated therewith should be immediately coated with the second coating before it is stacked or rolled or else blocking will ruin the entire mass of paper or board.

It should also be pointed out that if desired the second coating can be set and glossed to a continuous highly glossed film following the teachings of the copending applications mentioned above, especially of the last-mentioned application.

If only the material of the second coating of my invention were applied to the paper, that is, if the precoat of a mixture of butadiene-styrene resinous copolymer and butadiene-styrene rubbery copolymer were omitted and it were attempted to make a greaseproof paper by application of one heavy coat or a plurality of coats of the mixture of styrene-acrylonitrile resinous copolymer and butadiene-acrylonitrile rubbery copolymer, it would be necessary to apply an excessive amount of the last-mentioned mixture to obtain equivalent greaseproofness and the cost would be excessive. In contrast, the present invention enables the requisite greaseproofness to be attained at a cost which is sufficiently low to be commercially feasible and attractive.

Having thus described my invention, what I claim and desire to protect by Letters Patent is:

1. As a new article of manufacture, greaseproof paper having a first coating of the solids deposited by removal of water from an applied film of an aqueous dispersion of a resinous copolymer of styrene and butadiene in proportions ranging from 80 to 90% of styrene and correspondingly from 20 to 10% of butadiene and a rubbery copolymer of butadiene and styrene in proportions ranging from 50 to 80% of butadiene and correspondingly from 50 to 20% of styrene, said copolymers being employed in relative proportions of from 30 to 80% of said resinous copolymer and correspondingly from 70 to 20% of said rubbery copolymer, said first coating being deposited directly on the surface of the paper, and, superimposed upon said first coating, a second coating of the solids deposited by removal of water from an applied film of an aqueous dispersion of a resinous copolymer of styrene and acrylonitrile in proportions ranging from 65 to 80% of styrene and correspondingly from 35 to 20% of acrylonitrile and a rubbery copolymer of butadiene and acrylonitrile in proportions ranging from 55 to 80% of butadiene and correspondingly from 45 to 20% of acrylonitrile, said last-named resinous and rubbery copolymers being employed in relative proportions of from 45 to 70% of said last-named resinous copolymer and correspondingly from 55 to 30% of said last-named rubbery copolymer.

2. Paper as recited in claim 1 wherein the amount of said first coating ranges from 0.25 to 0.5 pound of said first-mentioned copolymers per 1,000 square feet of surface and wherein the amount of said second coating ranges from 1.5 to 3.0 pounds of said second-mentioned copolymers per 1,000 square feet of surface.

3. A process of making grease-proof paper which comprises applying directly to the surface of paper in sheet form a coating of an aqueous dispersion of a resinous copolymer of styrene and butadiene in proportions ranging from 80 to 90% of styrene and correspondingly from 20 to 10% of butadiene and a rubbery copolymer of butadiene and styrene in proportions ranging from 50 to 80% of butadiene and correspondingly from 50 to 20% of styrene, said copolymers being employed in relative proportions of from 30 to 80% of said resinous copolymer and correspondingly from 70 to 20% of said rubbery copolymer, drying said coating, subsequently applying over the dried coating a coating of an aqueous dispersion of a resinous copolymer of styrene and acrylonitrile in proportions ranging from 65 to 80% of styrene and correspondingly from 35 to 20% of acrylonitrile and a rubbery copolymer of butadiene and acrylonitrile in proportions ranging from 55 to 80% of butadiene and correspondingly from 45 to 20% of acrylonitrile, said last-named resinous and rubbery copolymers being employed in relative proportions of from 45 to 70% of said last-named resinous copolymer and correspondingly from 55 to 30% of said last-named rubbery copolymer, and drying said last-named coating.

4. The process recited in claim 3 wherein the amount of said first-named coating is such as to deposit from 0.25 to 0.5 pound of said first-named resinous and rubbery copolymer per 1,000 square feet of surface and wherein the amount of said second-named coating is such as to deposit from 1.5 to 3.0 pounds of said second-named resinous and rubbery copolymers per 1,000 square feet of surface.

WILLIAM W. COWGILL.

REFERENCES CITED

The following references are of record in the file of this patent:

UNITED STATES PATENTS

| Number | Name | Date |
|---|---|---|
| 2,140,048 | Fikentscher | Dec. 13, 1938 |
| 2,416,232 | Soday | Feb. 18, 1947 |
| 2,439,202 | Daly | Apr. 6, 1948 |
| 2,453,880 | Vanderbilt | Nov. 16, 1948 |

OTHER REFERENCES

Ser. No. 397,138, Fikentscher (A. P. C.), pub. May 11, 1943.